United States Patent
Soeda et al.

(10) Patent No.: US 6,168,318 B1
(45) Date of Patent: Jan. 2, 2001

(54) OPTICAL FIBER POSITIONING DEVICE AND OPTICAL CONNECTOR PROVIDED WITH THIS DEVICE

(75) Inventors: Tomoichi Soeda; Toru Yamaguchi, both of Tokyo (JP)

(73) Assignee: Ando Electric Co., Ltd., Tokyo (JP)

( * ) Notice: Under 35 U.S.C. 154(b), the term of this patent shall be extended for 0 days.

(21) Appl. No.: 09/105,827

(22) Filed: Jun. 26, 1998

(30) Foreign Application Priority Data

Jun. 27, 1997 (JP) .................................................... 9-172501

(51) Int. Cl.⁷ ........................................................ G02B 6/36
(52) U.S. Cl. .............................................................. 385/78
(58) Field of Search ................................ 385/76–78, 139

(56) References Cited

U.S. PATENT DOCUMENTS

| | | | |
|---|---|---|---|
| 4,640,575 | * 2/1987 | Dumas | 385/134 |
| 5,030,120 | * 7/1991 | Hartley | 439/144 |
| 5,155,900 | * 10/1992 | Grois et al. | 29/758 |
| 5,363,460 | * 11/1994 | Marazzi et al. | 385/70 |
| 5,687,268 | * 11/1997 | Stephenson et al. | 385/73 |
| 5,845,036 | * 12/1998 | De Marchi | 385/139 |
| 5,883,995 | * 3/1999 | Lu | 385/60 |

FOREIGN PATENT DOCUMENTS 8-644    1/1996   (JP) .

\* cited by examiner

*Primary Examiner*—John D. Lee
*Assistant Examiner*—Michelle R. Connelly-Cushwa
(74) *Attorney, Agent, or Firm*—Fish & Richardson P.C.

(57) ABSTRACT

The optical fiber positioning device (21) of the present invention is provided with: an optical connector main body (10) for supporting an optical fiber (3) which passes therethrough; a ferrule (2), which is provided coaxially with the optical fiber at the lead end side of the optical connector main body and through which the optical fiber passes; and a nut (9) which is disposed outside this ferrule. Furthermore, the optical fiber positioning device is provided with: a pair of arms (22), which are attached on the left and right of the optical connector main body in such a manner as to be freely rotatable about an axle (33) perpendicular to the axis of the optical connector main body; a support part (25) which is provided spanning the rotational lead end parts of the pair of arms, and which has a contact surface (26) with which the lead ends of the ferrule and optical fiber come into contact; and a support mechanism (28) which is provided on the arms and which positions the support part at either a ferrule-contacting position on the lead end side of the axle or a withdrawn position rearward from the axle.

9 Claims, 5 Drawing Sheets

OPTICAL FIBER POSITIONING DEVICE AND OPTICAL CONNECTOR PROVIDED WITH THIS DEVICE

BACKGROUND ART

1. Field of the Invention

The present invention relates to a positioning device for optical fibers which serves to align the lead end of a ferrule and the lead end of an optical fiber after the optical fiber has been inserted into the ferrule at the lead end of an optical connector; the present invention also relates to an optical connector which is provided with the device described above. This application is based on patent application No. Hei 9-172501 filed in Japan, the content of which is incorporated herein by reference.

2. Background Art

A method for aligning the lead end of the ferrule and the lead end of the optical fiber after the optical fiber has been inserted into the ferrule, and a positioning device employed in this method, will be explained based on FIGS. 1 through 3 and FIG. 4.

An example of this installation method is depicted in FIGS. 1–3. In the figures, reference 1 indicates the optical connector, reference 2 indicates the ferrule, reference 2A indicates the end surface of the ferrule, reference 3 indicates an optical fiber, reference 3A indicates the core of the optical fiber, reference 9 indicates a nut, and reference 10 indicates an optical connector main body which supports optical fiber 3.

Concretely, the method operates in the following manner. First, as shown in FIG. 1, optical fiber 3 is inserted into a penetrating hole (not depicted in the figure) formed in optical connector 1, and as shown in FIG. 2, the optical fiber core 3A protrudes from ferrule 2. Additionally, the optical fiber 3 is supported in optical connector main body 10 by means of the fiber support mechanism 11 provided in optical connector main body 10. In this state, the optical fiber 3 is slowly withdrawn in a direction opposite to the direction of insertion, as shown in FIG. 3, and the end surface of optical fiber core 3A and the end surface 2A of ferrule 2 are aligned.

FIG. 4 shows an example of a device which was conventionally employed in order to align the end surface of optical fiber core 3A and the end surface 2A of ferrule 2. In FIG. 4, those portions of the structure which were depicted in FIG. 3 are given the same reference numbers.

In this device, plug 4 is pushed into contact with ferrule 2, and a sleeve 5 is inserted around plug 4 and ferrule 2. Furthermore, a pair of adapters 7 and 8 engage the support part 6 which supports sleeve 5. Nut 9 of optical connector 1 is screwed onto adapter 7, and ferrule 2 is supported by adapter 7 via spring 12 and the like by means of this nut 9. In the same manner, a nut 9A provided on the plug 4 side is screwed onto adapter 8, and plug 4 is supported by adapter 8 by means of this nut 9A.

When the device is to be used, the optical fiber 3 is inserted into a guide hole 2a in the lead end of ferrule 2. Then, the end surface of optical fiber core 3A and the end surface 2A of ferrule 2 are brought into alignment by means of the manual feel when the end surface of optical fiber core 3A comes into contact with the lead end surface of plug 4. After positioning, optical fiber 3 is supported on optical connector main body 10 by means of the fiber support mechanism 11 of optical connector main body 10.

However, in the technology described above, the former positioning method has the following problems.

(1) Because the operation is conducted visually, it is impossible to accurately align the end surface of optical fiber 3A and the end surface 2A of ferrule 2.

(2) Because the operation is conducted visually, the adjustment of positioning requires a considerable amount of time.

Furthermore, the latter positioning device has the following problems.

(1) Adapters 7 and 8, and plug 4, are necessary, so that the structure of the device is complicated.

(2) The device and optical connector 1 are fastened to each other by means of screws, so that attachment and detachment requires time.

(3) There is a danger that damage will be caused to the lead end of the optical fiber 3 inserted into the device, as well as to the lead end of the optical fiber positioned at the plug 4 side.

(4) When the lead end of the optical fiber becomes dirty, there are large connection losses, so that it is necessary that the lead end of plug 4 be clean; however, as a result of the structure of the device, it is impossible to easily clean the lead end surface of plug 4.

The present invention has as an object thereof to provide a positioning device for optical fibers, and a optical connector which is provided with this device, which is capable of accurately aligning the end surface of optical fiber core 3A and the end surface 2A of ferrule 2 in a short period of time, and moreover, which is simple and which allows for the easy cleaning of the lead end surface of the ferrule.

DISCLOSURE OF THE INVENTION

The optical fiber positioning device of the present invention is provided with: an optical connector main body for supporting an optical fiber which passes therethrough; a ferrule, which is provided coaxially with the optical fiber at the lead end side of the optical connector main body and through which the optical fiber passes; and a nut which is disposed outside this ferrule. Furthermore, the optical fiber positioning device is provided with: a pair of arms, which are attached on the left and right of the optical connector main body in such a manner as to be freely rotatable about an axle perpendicular to the axis of the optical connector main body; a support part which is provided spanning the rotational lead end parts of the pair of arms, and which has a contact surface with which the lead ends of the ferrule and optical fiber come into contact; and a support mechanism which is provided on the arms and which positions the support part at either a ferrule-contacting position on the lead end side of the axle or a withdrawn position rearward from the axle.

Here, the support mechanism comprises projections provided on the inside of the arms. These projections engage either with grooves provided on the side parts of the optical connector main body or with side surfaces of the nut.

Furthermore, it is preferable that holes, through which the axis described above passes and which have an elongated shape extending in a longitudinal direction of the arms, be formed in the arms.

The contact surface described above is preferably formed with a groove shape so as to engage the lead end of the ferrule. Here, it is preferable that an upward facing groove be formed in the upper side of the contact surface of the support part.

BRIEF DESCRIPTION OF THE DIAGRAMS

BEST MODE FOR CARRYING OUT THE INVENTION

Embodiments

Figure 1:
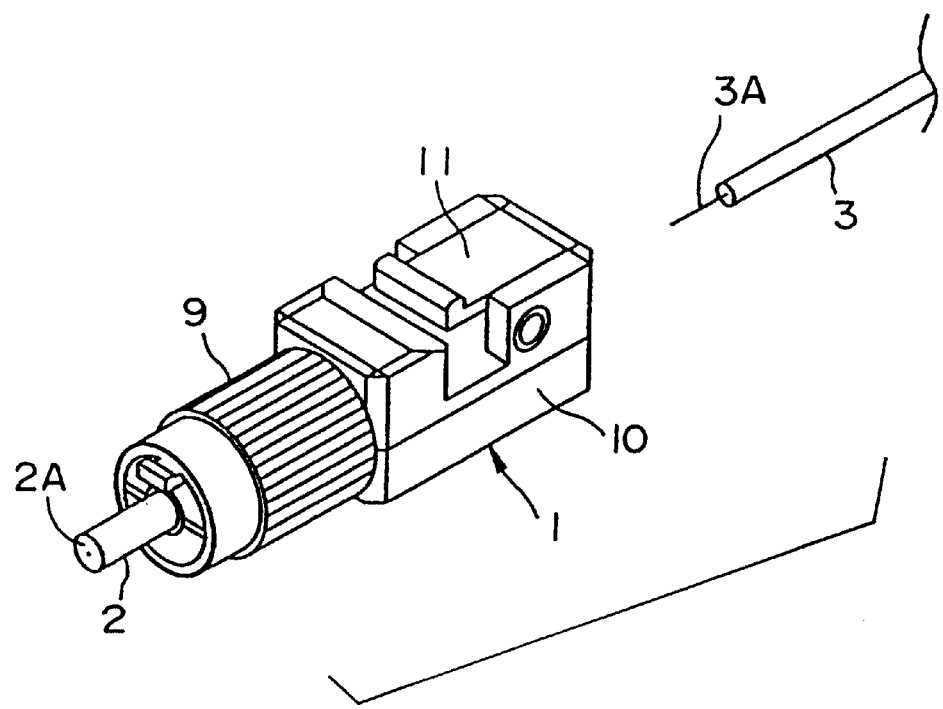
FIG. 1 is an angled view showing a conventional optical connector structure and optical fiber positioning method.
Figure 2:
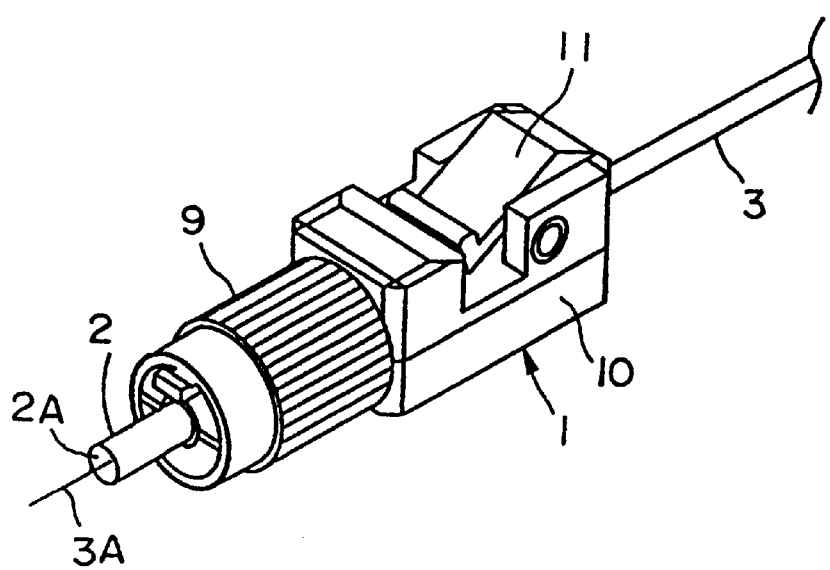
FIG. 2 is an angled view showing a conventional optical connector structure and optical fiber positioning method.
Figure 3:
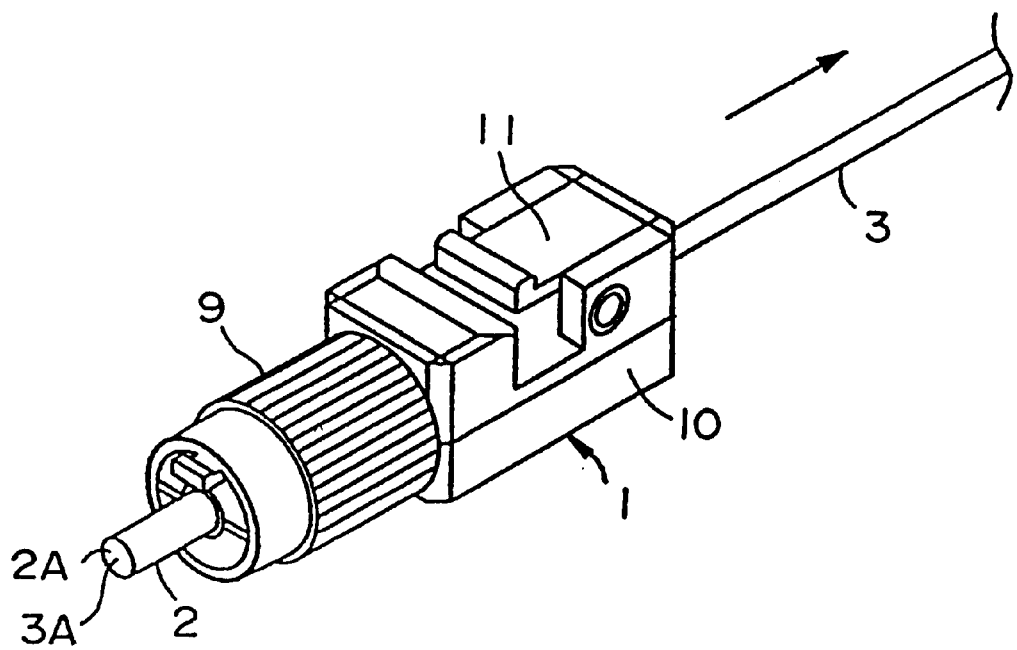
FIG. 3 is an angled view showing a conventional optical connector structure and optical fiber positioning method.
Figure 4:
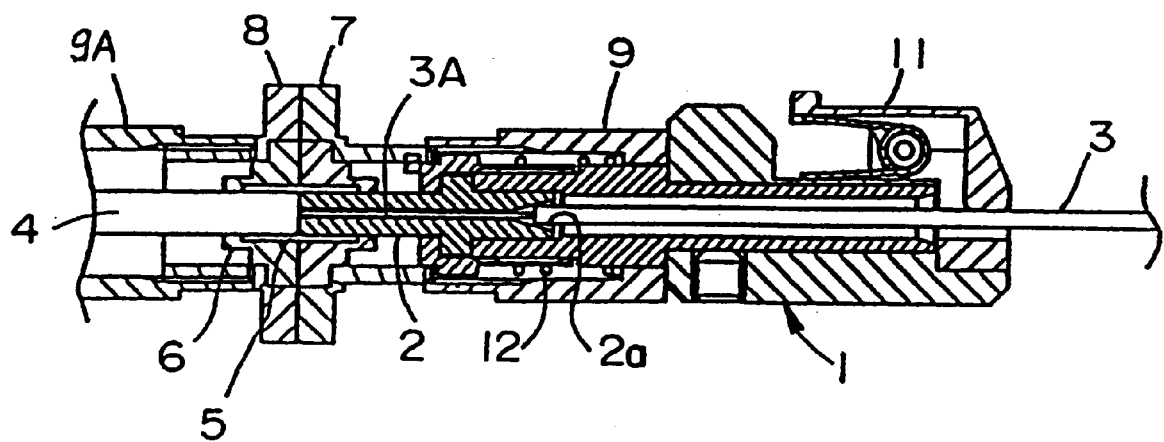
FIG. 4 is a cross-sectional view showing a conventional optical fiber positioning device.
Figure 5:
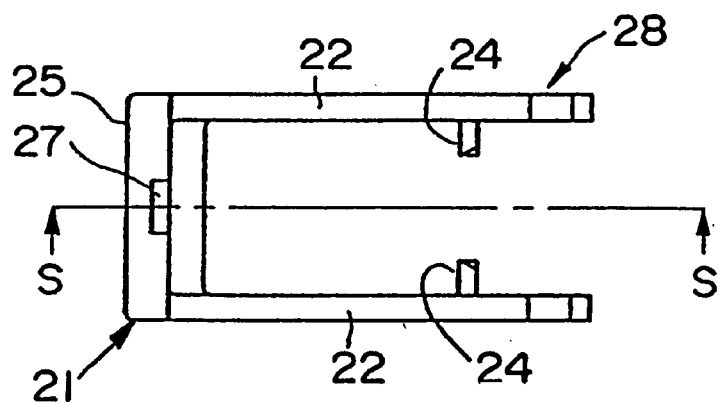
FIG. 5 is a top view showing the optical fiber positioning device of the present invention.
Figure 6:
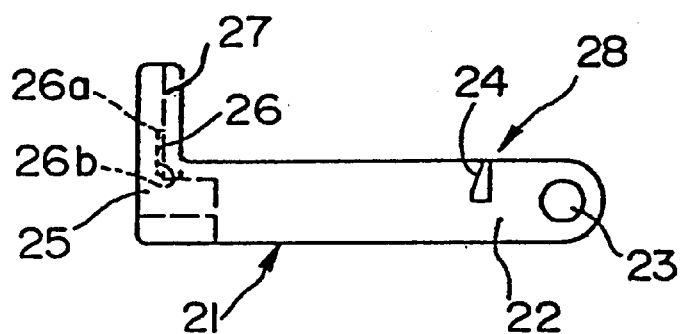
FIG. 6 is a right view of the optical fiber positioning device of the present invention.
Figure 7:
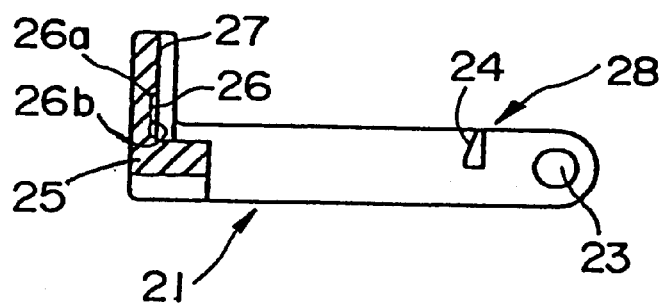
FIG. 7 is a cross-sectional view taken along line S—S of FIG. 5.
Figure 8:
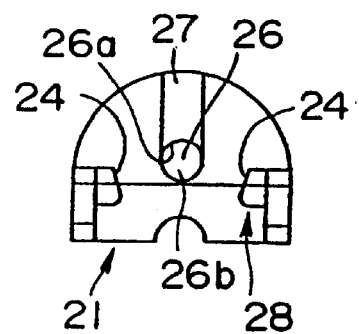
FIG. 8 is a front side view of the optical fiber positioning device of the present invention.

Hereinbelow, embodiments of the present invention will be explained based on the figures. In the explanation below, those parts which are identical to those described in FIGS. 1 through 3 will be given identical reference numbers.

In FIGS. 5 through 12, reference 21 indicates the optical fiber positioning device, while reference 31 indicates the optical connector. Optical connector 31 is provided with, in the left and right side surfaces of the optical connector main body 10, engaging grooves 32, and an axle 33 which projects to the side at the lead end side of engaging grooves 32.

Figure 9:
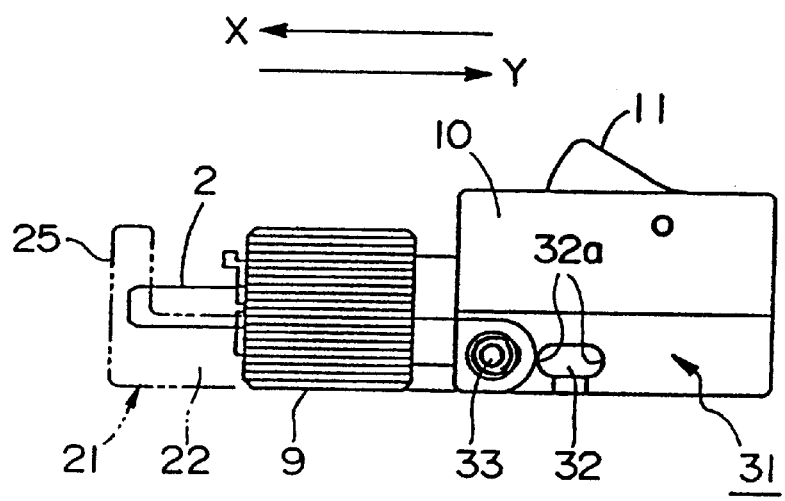
FIG. 9 is a front view of an optical connector provided with the optical fiber positioning device of the present invention.
Figure 10:
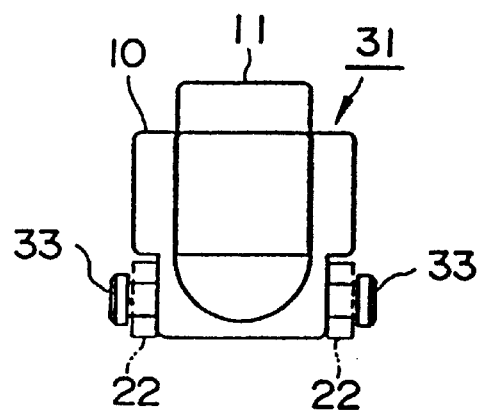
FIG. 10 is a right side view of an optical connector provided with the optical fiber positioning device of the present invention.
Figure 11:
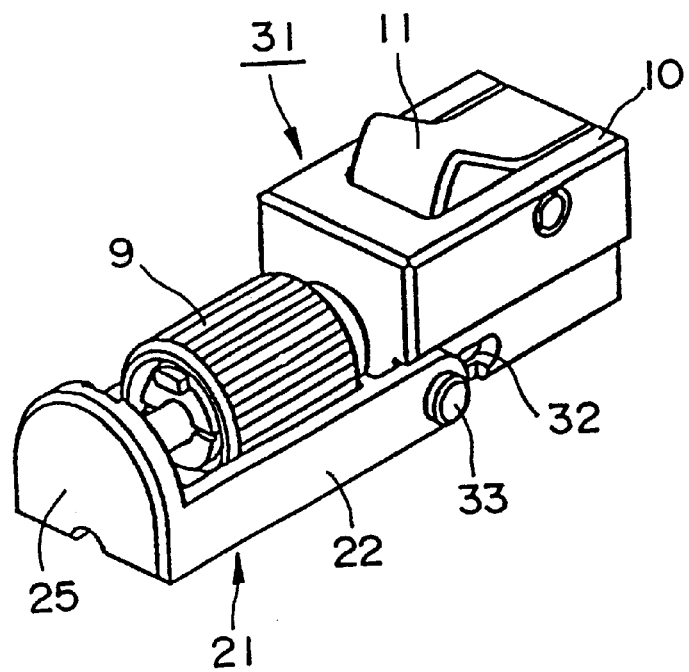
FIG. 11 is an angled view of an optical connector provided with the optical fiber positioning device of the present invention.

Optical fiber positioning device 21 is provided with a pair of arms 22. As shown in FIGS. 9 through 11, arms 22 are attached at the left and right of optical connector main body 10 so as to be freely rotatable about axle 33. Furthermore, arms 22 are coupled at the rotational lead end part thereof by means of a support part 25.

Figure 12:
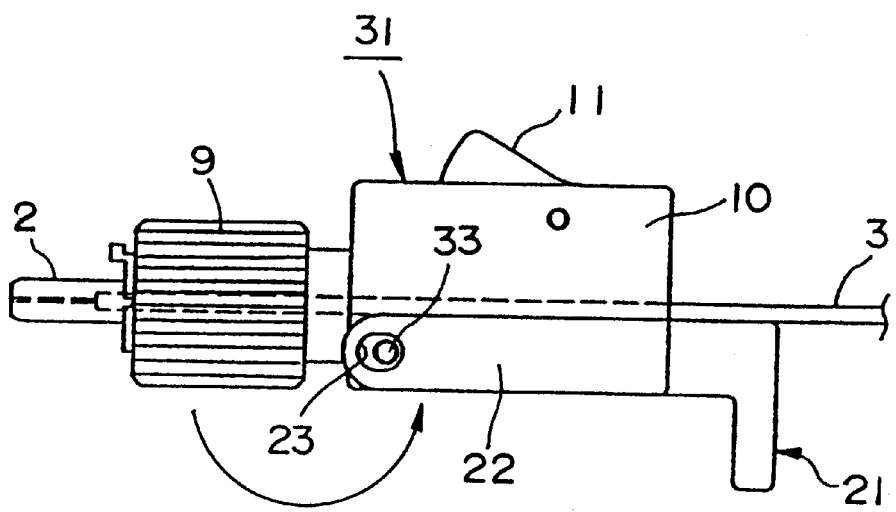
FIG. 12 is a front view of an optical connector provided with the optical fiber positioning device of the present invention, at the completion of optical fiber positioning.

Arms 22 are provided with a support mechanism 28 for positioning support part 25 at either the lead end side of axle 33 (the ferrule-contacting position), as shown in FIG. 11, or at the rearward side of axle 33 (the withdrawn position), as shown in FIG. 12. In this embodiment, support mechanism 28 comprises a pair of projections 24 which are provided on the inner side of support arms 22, and serves to position support part 25 in either the ferrule-contacting position or the withdrawn position by means of the engagement of projections 24 either in the outer circumference of nut 9 or in grooves 32.

Holes 23, which engage axle 33, are provided in the base end part of arms 22. These holes 23 have the shape of lengthened holes which extend in the longitudinal direction of arms 22.

Support part 25 is provided with a contact surface 26, and a groove 27 which faces in the upward direction of contact surface 26 and is formed so as to be slightly larger than the outer diameter of ferrule 2. In the ferrule-contacting position shown in FIG. 11, the lead end of ferrule 27 and the lead end of the optical fiber 3 which is inserted in ferrule 2, are in contact with the contact surface 26. Contact surface 26 has the shape of a groove which extends deeper than groove 27, and as a result, the upper end of contact surface 26 forms an engaging step 26a which engages with the upper end of ferrule 2 which comes into contact with contact surface 26, and restricts the downward movement of support part 25 caused by the weight thereof. Furthermore, the floor 26b of contact surface 26 is flat and perpendicular to the axial line of ferrule 2.

As shown in FIG. 11, in order to position the optical fiber 3, the optical fiber positioning device 21, which is installed on optical connector main body 10, is engaged with ferrule 2. At this time, projections 24 are engaged with the outer circumference of nut 9. Furthermore, in the state in which the contact surface 26 of support part 25 is in contact with the lead end of ferrule 2, the engaging step 26a of contact surface 26 engages with the lead end of ferrule 2. In this way, a plurality of parts are engaged with one another, so that it is possible to reliably support the optical fiber positioning device 21 with respect to optical connector main body 10.

In this state, optical fiber 3 is inserted into ferrule 2, the end surface of optical fiber core 3A comes into contact with contact surface 26, and the positioning of optical fiber 3 is accomplished.

After positioning, as shown in FIG. 12, optical fiber positioning device 21 is rotated through 180° while supported by rotational axle 33. At this time, using the lengthened holes 23 which engage the rotational axle 33, the optical fiber positioning device 21 is moved in the direction marked X in FIG. 9, and once the lead end of ferrule 2 and the contact surface 26 are no longer engaged, the optical fiber positioning device 21 is rotated through 180°. Furthermore, in the state in which projections 24 are inserted into engaging grooves 32 and are in contact with the ceiling part of engaging grooves 32, holes 23 are used, and the optical fiber positioning device 21 is slid in the direction marked X or the direction marked Y in FIG. 9. By means of this, it is possible to engage projections 24 with the innermost portions 32a of engaging grooves 32, and as a result, even if released, the optical fiber positioning device 21 will not rotate, and will remain in the withdrawn position shown in FIG. 12.

By means of this invention, it is possible to conduct the positioning of an optical fiber 3 and the connection thereof to a machine without removing the optical fiber positioning device 21 from the optical connector main body 10. Furthermore, the optical fiber positioning device 21 is attached to the optical connector main body 10, so that it is possible to shorten the amount of time required for the positioning operation of optical fiber 3 and it is possible to accurately conduct positioning. Furthermore, the cleaning of the contact surface of ferrule 2 is also a simple matter.

Furthermore, support mechanism 28 is formed from projections 24 which are provided on the inner sides of arms 22, so that the structure of the support mechanism is simple.

Furthermore, contact surface 26 is formed with a groove shape which engages with the lead end of ferrule 2, so that when contact surface 26 is engaged with the lead end of ferrule 2, unnecessary rotation of support part 25 is prevented.

Furthermore, groove 27 is formed in the upper side of contact surface 26 of support part 25, so that interference between the support part 25 and the lead end of ferrule 2 is prevented when support part 25 is rotated from the ferrule-contacting position to the withdrawn position, or when rotated in the opposite direction.

Moreover, the holes 23 through which axle 33 extends have an elongated shape extending in the longitudinal direction of arms 22, so that it is possible to shift the rotational center of the optical fiber positioning apparatus where necessary, and interference between the support part 25 and the lead end of the ferrule 2 can be prevented here as well.

In the embodiment described above, a pair of projections 24 provided on the inner side of arms 22 were used as the support mechanism 28 for positioning support part 25 at either the ferrule-contacting position or the withdrawn position; however, this is only one example, and appropriate design modifications are possible where necessary. For example, the support part 25 could itself be provided with projections, and these could engage nut 9 or optical connector main body 10.

What is claimed is:

1. An optical fiber positioning device combined with an optical connector comprising an optical connector main body for supporting an optical fiber which passes therethrough, a ferrule which is provided coaxially with said optical fiber at the lead end side of said optical connector main body and through which said optical fiber passes, and a nut which is disposed outside said ferrule, wherein the fiber positioning device comprises:
   a pair of arms, which are attached on the left and right of said optical connector main body so as to be freely rotatable about an axle perpendicular to the axis of said optical connector main body;
   a support part that spans rotational lead end parts of said pair of arms, and which has a contact surface with which lead ends of said ferrule and said optical fiber come into contact during positioning of the optical fiber, wherein said contact surface is formed in a groove shape which engages the lead end of said ferrule; and
   a support mechanism which is provided on said arms and which positions said support part at either a ferrule-contacting position on the lead end side of said axle or a withdrawn position rearward from said axle.

2. An optical fiber positioning device in accordance with claim 1, wherein holes, through which said axle is extended, are formed in said arms, and these holes have an elongated shape extending in the longitudinal direction of said arms.

3. An optical fiber positioning device in accordance with claim 2, wherein a groove facing upwards is formed in the under side of said contact surface of said support part.

4. An optical fiber positioning device in accordance with claim 1, wherein a groove facing upward is formed in the upper side of said contact surface of said support part.

5. An optical fiber positioning device combined with an optical connector comprising an optical connector main body for supporting an optical fiber which passes therethrough, a ferrule which is provided coaxially with said optical fiber at a lead end side of said optical connector main body and through which said optical fiber passes, and a nut which is disposed outside said ferrule wherein the fiber positioning device comprises:
   a pair of arms, which are attached on the left and right of said optical connector main body so as to be freely rotatable about an axle perpendicular to the axis of said optical connector main body;
   a support part that spans rotational lead end parts of said pair of arms, and which has a contact surface with which the lead ends of said ferrule and said optical fiber come into contact during positioning of the optical fiber, wherein said contact surface is formed in a groove shape which engages the lead end of said ferrule; and
   a support mechanism which is provided on said arms and which positions said support part at either a ferrule-contacting position on the lead end side of said axle or a withdrawn position rearward from said axle;
   wherein said support mechanism comprises projections provided on inner sides of said arms, and these projections engage grooves formed in side parts of said optical connector main body or side surfaces of said nut.

6. An optical fiber positioning device in accordance with claim 5, wherein holes, through which said axle is extended, are formed in said arms, and these holes have an elongated shape extending in the longitudinal direction of said arms.

7. An optical fiber positioning device in accordance with claim 6, wherein a groove facing upward is formed in the upper side of said contact surface of said support part.

8. An optical fiber positioning device in accordance with claim 5, wherein a groove facing upward is formed in the upper side of said contact surface of said support part.

9. An optical connector comprising an optical connector main body for supporting an optical fiber which passes therethrough, a ferrule which is provided coaxially with said optical fiber at a lead end side of said optical connector main body and through which said optical fiber passes, and a nut which is disposed outside said ferrule; a pair of axles that are formed on side surfaces of said optical connector main body and projecting perpendicular to the axis of said optical connector main body, and an optical fiber positioning device comprising:
   a pair of arms, which are attached on the left and right of said optical connector main body so as to be freely rotatable about said axles;
   a support part that spans rotational lead end parts of said pair of arms, and which has a contact surface with which lead ends of said ferrule and said optical fiber come into contact during positioning of the optical fiber, wherein said contact surface is formed in a groove shape which engages the lead end of said ferrule; and
   a support mechanism provided on said arms and which positions said support part at either a ferrule-contacting position on lead end side of said axles or a withdrawn position rearward from said axles.

* * * * *